United States Patent
Dansui et al.

(10) Patent No.: US 6,811,921 B2
(45) Date of Patent: Nov. 2, 2004

(54) BATTERY PACK (75) Inventors: Yoshitaka Dansui, Fujisawa (JP); Hideki Kasahara, Naka-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 477 days.

(21) Appl. No.: 10/031,267

(22) PCT Filed: Feb. 26, 2001

(86) PCT No.: PCT/JP01/01433
§ 371 (c)(1),
(2), (4) Date: Oct. 19, 2001

(87) PCT Pub. No.: WO01/63681
PCT Pub. Date: Aug. 30, 2001

(65) Prior Publication Data
US 2003/0013009 A1 Jan. 16, 2003

(30) Foreign Application Priority Data

Feb. 25, 2000 (JP) ........................................ 2000-048833
Feb. 23, 2001 (JP) ........................................ 2001-047608

(51) Int. Cl.⁷ ................................................. H01M 2/10
(52) U.S. Cl. ........................... 429/99; 429/100; 429/96; 429/149; 429/152; 429/153; 429/157; 429/159
(58) Field of Search .......................... 429/99, 100, 96, 429/149, 152, 153, 157, 159

(56) References Cited

U.S. PATENT DOCUMENTS

| | | | | |
|---|---|---|---|---|
| 4,314,008 A | * | 2/1982 | Blake | 429/8 |
| 5,545,491 A | * | 8/1996 | Farley | 429/7 |
| 6,152,597 A | * | 11/2000 | Potega | 374/185 |
| 6,326,766 B1 | * | 12/2001 | Small | 320/112 |
| 6,372,377 B1 | * | 4/2002 | Ovshinsky et al. | 429/66 |
| 6,444,350 B1 | * | 9/2002 | Toya et al. | 429/90 |

FOREIGN PATENT DOCUMENTS

| | | |
|---|---|---|
| JP | 06-223804 | 8/1994 |
| JP | 07-014616 | 1/1995 |
| JP | 08-212989 | 8/1996 |
| JP | 9-298051 | 11/1997 |
| JP | 9-306447 | 11/1997 |
| JP | 10-154494 | 6/1998 |
| JP | 11-339766 | 12/1999 |
| JP | 2000-14028 | 1/2000 |

* cited by examiner

*Primary Examiner*—Bruce F. Bell
(74) *Attorney, Agent, or Firm*—Jordan and Hamburg LLP

(57) ABSTRACT

A battery pack comprises: a battery unit (12) including a plurality of batteries (1) arranged flatly and electrically connected with one another by either series or parallel connection, or a combination thereof; a pair of heat transfer plates (8a, 8b) made of a material exhibiting excellent thermal conductivity and arranged in parallel to a surface where the battery unit (12) is arranged, of which one makes surface contact with a top-surface side of each of the batteries (1) of the battery unit (12), and the other makes surface contact with a back-surface side of each of the batteries (1) of the battery unit (12); and a housing (2) made of a material exhibiting excellent thermal conductivity, the housing accommodating the battery unit (12) and the pair of heat transfer plates (8a, 8b) and making surface contact with the pair of heat transfer plates (8a, 8b).

12 Claims, 6 Drawing Sheets

BATTERY PACK

TECHNICAL FIELD

The present invention relates to a battery pack.

BACKGROUND ART

Conventionally, a backup battery has typically been realized by using a lead battery. In recent years, an alkaline storage battery and a lithium-ion secondary battery are coming into wider use as backup batteries in keeping with growing concern over the environment and an increasing demand for a more compact and lightweight battery. Moreover, as a driving battery, an alkaline storage battery, particularly, a nickel hydrogen storage battery has attracted attention and besides a lithium-ion secondary battery has been put to practical use.

In an enclosed-type nickel hydrogen storage battery, during charging and discharging processes, heat of reaction occurs due to gaseous hydrogen absorbing reaction, as well as Joule heat generated in the battery. This leads to a temperature rise. Thus, in a battery pack, like conventional ones, having a number of batteries arranged in a predetermined space thereof, although it varies with the charging current and thermal radiation characteristics of the battery, the battery temperature might rise up to 80° C. or above. A lithium-ion secondary battery also undergoes heat generation during charging and discharging processes.

Moreover, as described hereinabove, in a battery pack having a number of batteries closely arranged therein, the batteries located at the central part thereof are inhibited from exhibiting satisfactory thermal radiation due to their neighboring batteries and thus suffer from a significant temperature rise, as compared with the neighboring batteries.

Further, a nickel hydrogen storage battery is characterized in that the battery temperature significantly increases with higher ambient temperature. Thus, constituting a battery pack by using nickel hydrogen storage batteries creates substantial problems of, in addition to an undesirable temperature rise, great temperature differences among the individual batteries.

In general, an alkaline storage battery suffers from degradation in charging characteristics as well as degradation in service life characteristics under high temperature conditions. A lithium-ion secondary battery also exhibits poor service life characteristics under high temperature conditions.

To suppress such a temperature rise in a battery, various proposals have been made to date, for example, a method wherein a metal plate is inserted between batteries so as to dissipate heat from its one end (as disclosed in Japanese Patent Publication No. 7-14616), and a method wherein, of a plurality of batteries piled up, only the batteries located at the central part are provided with a heat dissipating plate (as disclosed in Japanese Patent Publication No. 6-223804).

However, the above-described proposals failed to come up with satisfactory solutions to a problem that batteries located at the central part are more susceptible to a temperature rise due to heat generation caused by their neighboring batteries, and to a problem that a heat-collecting effect exerted by a heating element is insufficient.

The present invention has been made to solve the above-described problems, and accordingly its main object is to provide a battery pack in which degradation in the charging and service life characteristics is prevented by suppressing a temperature rise in the battery due to heat generation.

DISCLOSURE OF THE INVENTION

To achieve the above object, a battery pack according to the present invention is characterized by comprising: a battery unit composed of a plurality of batteries arranged flatly, the batteries being electrically connected with one another by either series or parallel connection, or a combination of series connection and parallel connection; a pair of heat transfer plates made of a material exhibiting excellent thermal conductivity and arranged in parallel to a surface where the battery unit is arranged, of which one makes surface contact with the top-surface side of each of the batteries constituting the battery unit, and the other makes surface contact with the back-surface side of each of the batteries constituting the battery unit; and a housing made of a material exhibiting excellent thermal conductivity, the housing accommodating the battery unit and the pair of heat transfer plates and making surface contact with the pair of heat transfer plates.

According to the above-described structure, each of the batteries of the battery unit makes surface contact with the pair of heat transfer plates; the pair of heat transfer plates make surface contact with the housing; and the heat transfer plates and the housing are made of materials exhibiting excellent thermal conductivity. Thus, heat generated in the battery is efficiently transmitted through the housing and is then dissipated, thereby suppressing a rise in the battery temperature within the battery pack.

Although each of the batteries of the battery unit may preferably make surface contact with the pair of heat transfer plates at its substantially entire outer peripheral surface excluding the end faces thereof, it is essential only that at least 60% or more, preferably 75% or more, or optimally 90% or more of the area of the battery be brought into surface contact with the heat transfer plates. Moreover, by forming projections and depressions for dissipating heat, like a cooling fin, on the outer surface of the housing, heat dissipation is further facilitated, thereby suppressing a rise in the battery temperature within the battery pack.

The heat transfer plates and the housing may preferably be made of aluminum, copper, magnesium, or an alloy composed mainly of one of them. This is because these components are excellent in thermal conduction and are thus suited for suppressing a battery temperature rise. The heat transfer plate and the housing may preferably be separately fabricated to obtain as large a contact area therebetween as possible. However, if they are molded in one piece, the contact area is theoretically maximized. This is most desirable. Moreover, the heat transfer plate and the housing may be made of a thermally conductive resin which exhibits excellent thermal conductivity, for example, "SARCON GR-d t2.0" manufactured by Fuji Polymer Industries Co., Ltd. Since the thermally conductive resin in this example show the softness and elasticity, the heat transfer plate, even though it is flat-shaped, can make surface contact with the battery.

In constituting the battery unit, preferably, N pieces of axially connected batteries are integrated together to form a battery module, and the battery modules are arranged in M rows in parallel to each other. By performing temperature and voltage measurements separately for each battery module realized by mechanically and electrically connecting N pieces of batteries in series, discharge control is facilitated.

The present invention is suitably applied to such a battery pack as employs a cylindrical nickel hydrogen storage battery, or a cylindrical lithium-ion secondary battery, in particular.

BEST MODE FOR CARRYING OUT THE INVENTION

Figure 1:
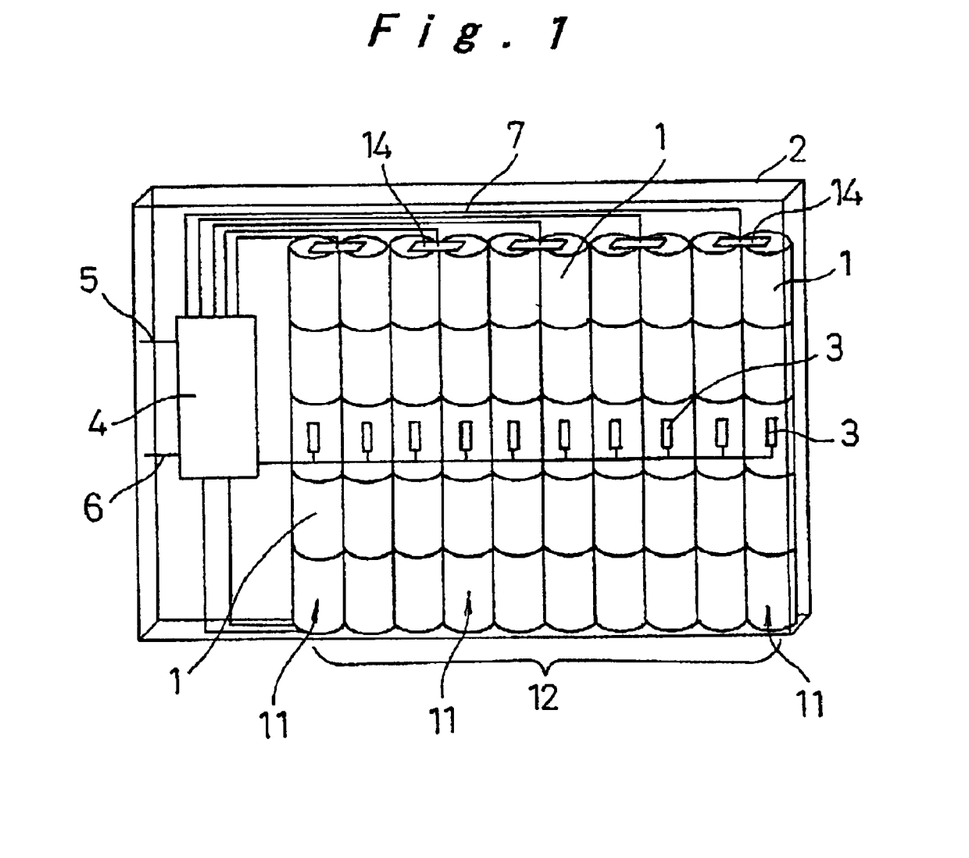
FIG. 1 is a schematic diagram of a first embodiment of a battery pack of the present invention.

Preferred embodiments of the present invention will be described hereinafter with reference to the accompanying drawings. First, a first embodiment of the battery pack of the present invention will be described with reference to FIGS. 1–7. In these figures, numeral 1 represents a cylindrical secondary battery (there may be cases where it will be simply referred to as "the battery"). An alkaline storage battery such as a nickel hydrogen storage battery and a nickel-cadmium storage battery, or a lithium-ion secondary battery is equivalent thereto. Numeral 2 represents a housing for accommodating a plurality of batteries 1; numeral 3 represents a temperature sensor for measuring the temperature of the battery 1; numeral 4 represents an electric circuit board for controlling charging and discharging of the battery 1; numeral 5 represents a charge line for charging the battery 1; and numeral 6 represents a discharge line for discharging the battery 1. Numeral 11 represents a battery module. The battery module is realized by axially connecting 5 pieces of batteries 1 in line. 5 pieces of batteries 1 are connected with one another by welding or other means and are further electrically connected in series with one another. 10 pieces of the battery modules 11 are flatly arranged so as to be parallel to and contiguous to one another, thereby constituting a battery unit 12. Shown in FIG. 1 is the battery unit 12 composed of 10 pieces of flatly arranged battery modules 11 in parallel to each other, wherein each battery module 11 comprises five axially-connected batteries 1, i.e. composed of 50 pieces of batteries 1.

Figure 2:
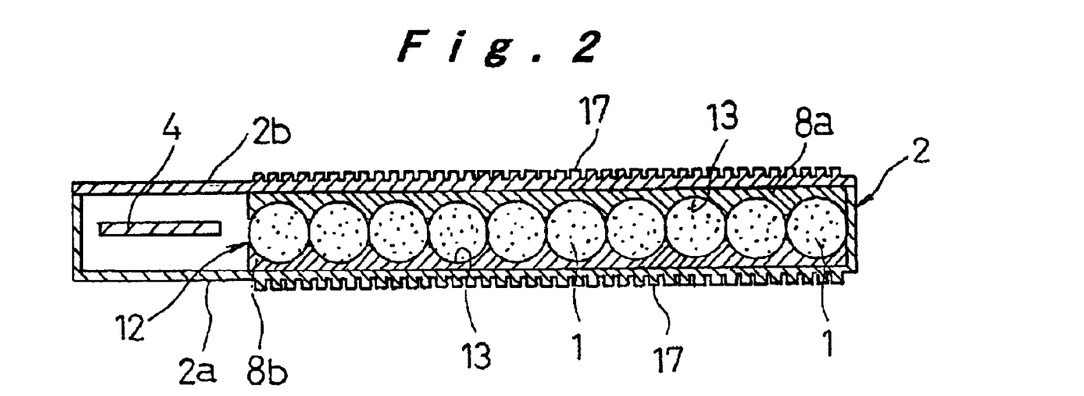
FIG. 2 is a cross-sectional view of the battery pack.

As shown in FIG. 2, the battery unit 12 has, on its top-surface side (front-surface side), an upper heat transfer plate 8a, and has, on its bottom-surface side (back-surface side), a lower heat transfer plate 8b. The upper and lower transmission plates are so disposed as to make surface contact with the top-surface side and the bottom-surface side of the battery 1, respectively. The heat transfer plates 8a and 8b, provided for efficient transferring of heat generated in the battery 1 to the housing 2, are made of aluminum, copper, magnesium, or an alloy composed mainly of one of them, or a material that exhibits excellent thermal conductivity, such as a thermally conductive resin. The heat transfer plates 8a and 8b have, on their surfaces making contact with the battery 1, 10 pieces of grooves 13 each having a section shaped like an arc. The top or bottom surface of the battery modules 11 makes surface contact with the grooves 13, respectively. Moreover, each of the heat transfer plates 8a and 8b is formed in a rectangular shape as seen from the plane, and has its surfaces, excluding the one having the grooves 13, made flat.

The housing 2 is shaped like a flat rectangular parallelepiped and is composed of a housing body 2a and a lid 2b. The housing body 2a and the lid 2b are each made of aluminum, copper, magnesium, or an alloy composed mainly of one of them, or a material that exhibits excellent thermal conductivity, such as a thermally conductive resin. The inner surface of the housing body 2a is formed as a plane surface and makes surface contact with the bottom surface of the lower heat transfer plate 8b. The housing body 2a has projections and depressions 17 for heat radiation formed on its outer surface (bottom surface). The inner surface of the lid 2b is formed as a plane surface and makes surface contact with the top surface of the upper heat transfer plate 8a. The lid 2b also has projections and depressions 17 for heat dissipation formed on its outer surface (top surface). The housing body 2a and the lid 2b are assembled together in a manner as shown in FIG. 2. In an internal space secured therein are accommodated the battery unit 12 and the heat transfer plates 8a and 8b having sandwiched therebetween the battery unit 12 so that they are kept in intimate contact with one another. Also accommodated therein are the electric circuit board 4 and others.

Figure 3:
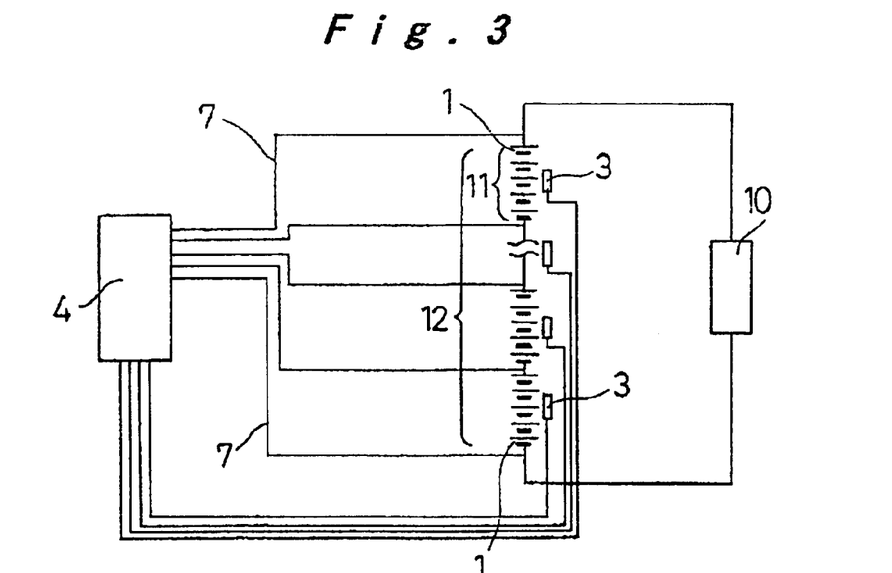
FIG. 3 is a schematic diagram of the electric circuit of the battery pack.

As shown in FIG. 3, 50 pieces of batteries 1 housed in the housing 2 are electrically connected in series with one another. As shown in FIG. 1, connecting pieces 14 electrically connects the battery modules 11 in series with one another. Moreover, a temperature sensor 3 is placed in the axial central portion of each battery module 11 to perform temperature measurement separately for each of the battery modules 11. Further, as shown in FIG. 3, a voltage measurement line 7 is provided for performing voltage measurement separately for each of the battery modules 11, i.e. for each of sets of five batteries connected in series with one another. Note that, in FIG. 3, numeral 10 represents discharge load.

Thereafter, Example 1 of the present invention and Comparative Example 1 will be described. A battery for use in Example 1 and Comparative Example 1 is a cylindrical nickel hydrogen storage battery which is 23 mm in diameter and 34 mm in height, and provides a battery capacity of 2000 mAh.

The battery pack of Example 1 has such a structure as shown in FIGS. 1–3. The heat transfer plates 8a and 8b are made of aluminum, and the housing 2 is made of a magnesium alloy.

The battery pack of Comparative Example 1 has a housing made of polypropylene resin but is similar in shape to that of Example 1. Moreover, Comparative Example 1 has no equivalent to the heat transfer plate. The other configuration (electric circuit, temperature sensor, wire, or the like) thereof is similar to that of Example 1.

The battery packs of Example 1 and Comparative Example 1 were each placed within a constant temperature bath kept at 20° C. Then, the batteries were charged at a constant current of 200 mA through the electric circuit board 4 for 15 hours. The highest value of the battery temperature obtained at that time will be shown in FIG. 4.

Generally, in a nickel hydrogen storage battery, a temperature rise is moderate until the battery is charged to 100% of its capacity. However, when the charging amount is about to exceed 100%, the temperature rises abruptly. This is because, as is already well known, charging electricity is stored in a battery until its amount reaches 100% of the battery capacity, but if the charging amount exceeds 100%, oxygen and hydrogen are generated within the battery and they react with each other to form water. This causes heat generation, resulting in a rise in the battery temperature.

Figure 4:
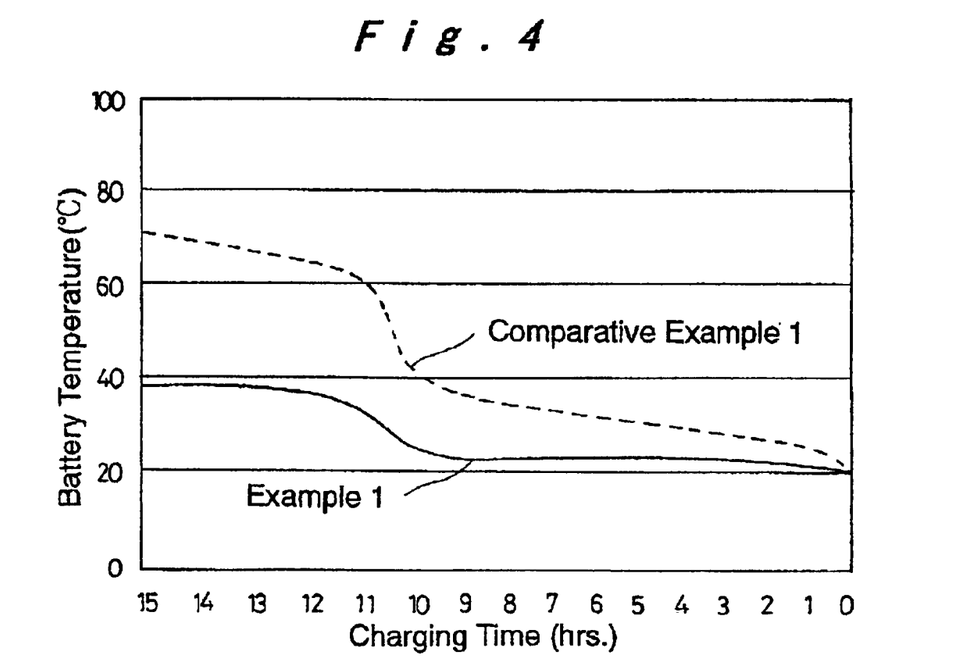
FIG. 4 is a diagram showing battery temperature as observed in Example 1 of the present invention and Comparative Example 1.

As shown in FIG. 4, in Example 1, an about 3° C. rise in the battery temperature was observed by the time of 100% charging. Even after the charging amount exceeds 100%, the temperature rise was found to be as small as 18° C. relative to ambient temperature of 20° C. By contrast, in comparative Example 1, an about 18° C. rise in the battery temperature was observed by the time of 100% charging, and, after the charging amount exceeds 100%, the temperature rise was found to be as large as about 50° C. relative to ambient temperature of 20° C.

As described hereinabove, by bringing an aluminum-made heat transfer plate exhibiting excellent thermal conductivity into surface contact with the entire outer periphery of the battery, and further by bringing a magnesium alloy-made housing exhibiting excellent thermal conductivity into surface contact with the heat transfer plate, heat generated in the battery is efficiently dissipated out of the housing, thereby suppressing a rise in the battery temperature.

After having been charged for 15 hours, the batteries were discharged at a current of 400 mA down to the battery unit voltage: 50V. Then, the amount of discharged electricity was measured and found to be 1900 mAh in Example 1 but found to be 1250 mAh in Comparative Example 1. This is because a nickel hydrogen storage battery usually suffers from degradation in charging efficiency under high temperature conditions.

As was already explained, a nickel hydrogen storage battery suffers from degradation in charging efficiency as well as short service life under high temperature conditions. Thus, the effects of decreasing battery temperature brought about by the present invention are significant.

Figure 5:
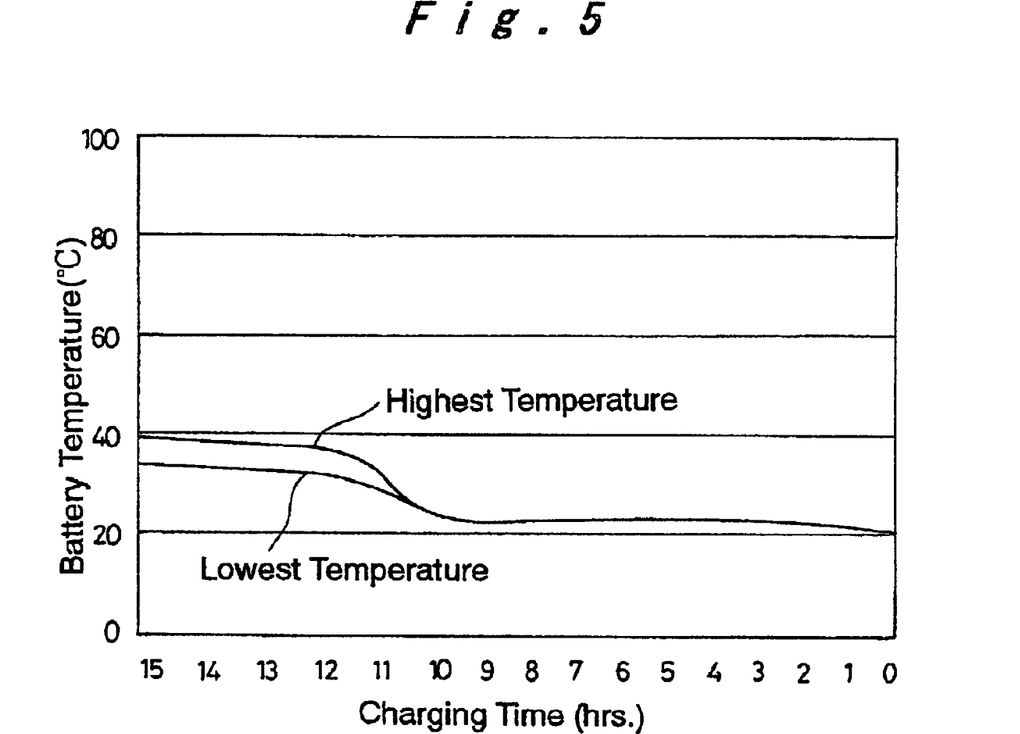
FIG. 5 is a diagram showing battery temperature as observed in Example 1 of the present invention.

FIG. 5 shows the highest and lowest temperatures of the battery of Example 1 as observed after a 15-hour charging. Difference between the highest and lowest temperatures was found to be about 4° C.

Figure 6:
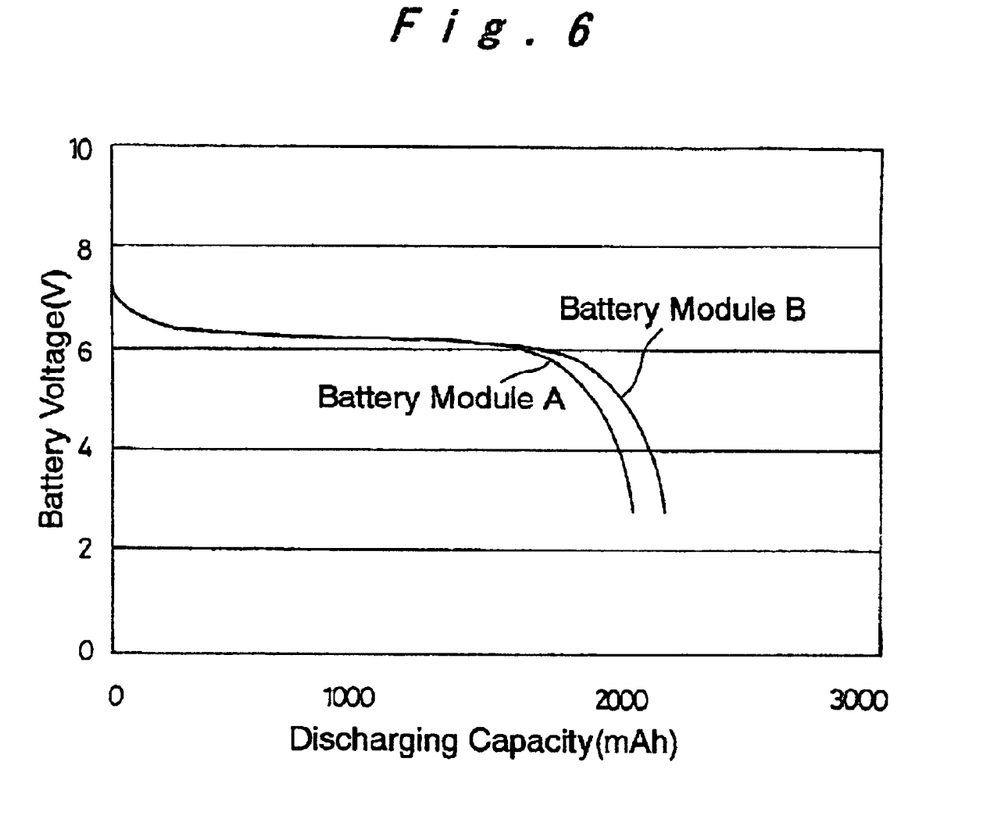
FIG. 6 is a diagram showing the discharge capacity of the battery unit of the battery pack.

FIG. 6 shows discharge capacity as observed after discharging was performed with a constant current of 400 mA subsequently to the charging shown in FIG. 5. Here, if it is assumed that one set of five batteries connected in series with one another (battery module) exhibiting the highest temperature at the time of discharging is Module A and another set of five batteries connected in series with one another (battery module) exhibiting the lowest temperature is Module B, then the capacity of Module A was found to be 1900 mAh, and the capacity of Module B was found to be 2000 mAh. Note that, for capacity calculation, the voltage of the set of five batteries (battery module) was set at 5V, that is, the voltage of a single battery was set at 1V. In the battery pack of Example 1, with the decrease of the absolute value of the battery temperature, the difference in temperature between the battery modules was reduced to 4° C. or below. However, the variability of the discharge capacity was on the order of 5%.

In a case where the battery pack in the above-described state is discharged during backup, the battery module having a smaller charging capacity runs down earlier than the other battery module and is thus brought into an over-discharged state. A nickel hydrogen storage battery suffers from degradation in battery characteristics when over-discharged. Thus, in the present invention, voltage measurement is conducted separately for the individual battery modules, and, when the voltage of any of the battery modules reaches a predetermined value, all of the battery module discharging operations are discontinued. This protects the battery modules against over-discharging, thereby preventing degradation in the battery characteristics.

Figure 7:
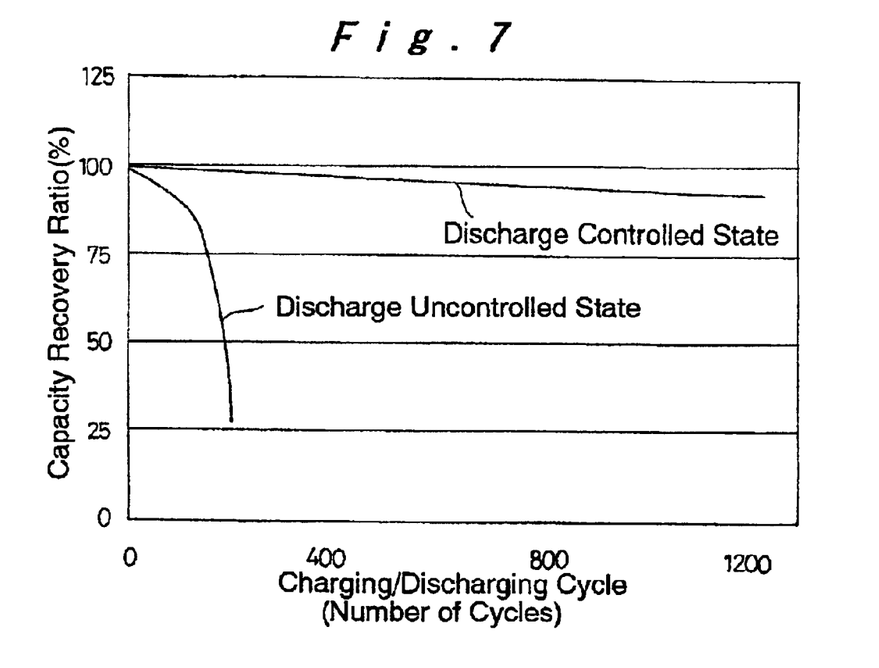
FIG. 7 is a diagram showing the service life characteristics of the battery unit.

FIG. 7 shows the service life of the battery pack according to the present invention, as observed when it was in a discharge controlled state and when it was in a discharge uncontrolled state. Charging was performed at a current of 200 mA for 12 hours, and discharging was performed at a current of 2000 mA. For the battery pack in the discharge controlled state, voltage measurement was made separately for the individual battery modules, and, when the voltage of any of the battery modules reached 5V, the discharging was stopped. For the battery pack in the discharge uncontrolled state, when the voltage of a set of 50 pieces of batteries reached 50V, the discharging was stopped. In this way, charging and discharging were repeatedly performed to examine the battery capacity. In the case where discharge control was conducted, the capacity recovery ratio was maintained at 90% even after the number of cycles exceeds 1200. By contrast, in the case where no discharge control was conducted, the battery quality started to deteriorate when the number of cycles reached about 200 and thus the capacity recovery ratio was drastically reduced.

Figure 8:
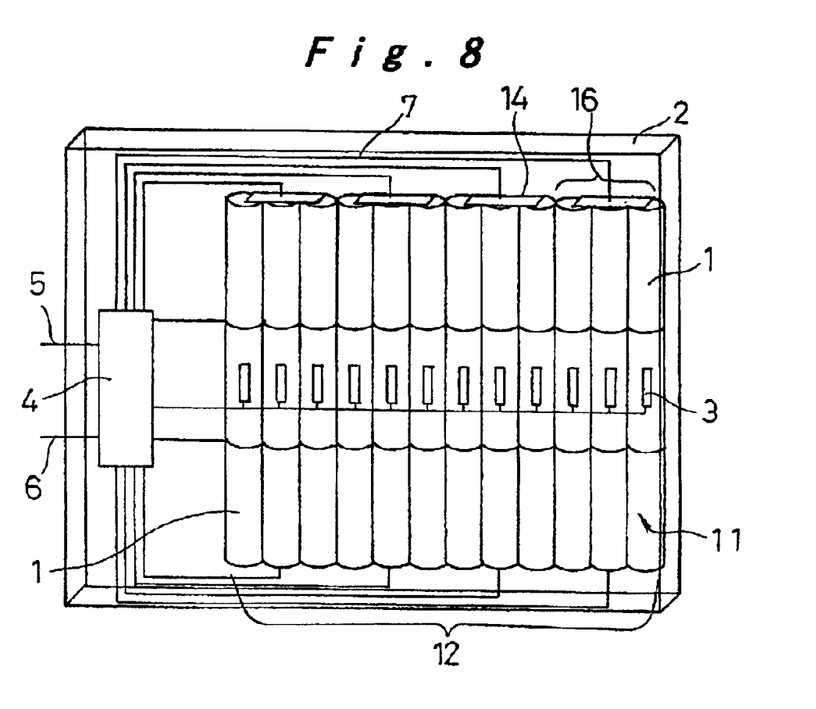
FIG. 8 is a schematic diagram of a second embodiment of the battery pack of the present invention.

Subsequently, a second embodiment of the battery pack of the present invention will be described with reference to FIGS. 8–9. The battery pack of the second embodiment has basically the same construction as that of the first embodiment, and is thus provided with: a battery 1; a housing 2; a temperature sensor 3; an electric circuit board 4; a charge line 5; a discharge line 6; a voltage measurement line 7; an upper heat transfer plate (see FIG. 2); a lower heat transfer plate (see FIG. 2); and a connecting piece 14.

The second embodiment differs from the first embodiment in that 3 pieces of batteries 1 are electrically and mechanically connected in series with one another to constitute a single battery module 11, that 3 pieces of battery modules 11 are electrically connected in parallel with one another to constitute a battery block 16 including 9 pieces of batteries 1 in total, and that 4 pieces of battery blocks 16 are electrically connected in series with one another to constitute a battery unit 12. As shown in FIG. 8, 36 pieces of batteries 1 in total are arranged flatly and are electrically connected with one another to constitute the battery unit 12. Each of the batteries 1 included in the battery unit 12 makes surface contact with the upper and lower heat transfer plates at its outer peripheral surface. The battery unit 12 and the upper and lower heat transfer plates are housed in the housing 2 making surface contact with the upper and lower heat transfer plates. Each of the battery modules 11 has the temperature sensor 3 placed on its axial central portion, so that temperature measurement is performed separately for each of the battery modules 11. Moreover, voltage measurement is performed separately for each of the battery blocks 16.

Next, Example 2 of the present invention and Comparative Example 2 will be described. A battery for use in Example 2 and Comparative Example 2 is a cylindrical lithium-ion secondary battery which is 18 mm in diameter and 65 mm in height, and provides a battery capacity of 1400 mAh.

In the battery pack of Example 2, both of the heat transfer plates are made of aluminum, and the housing 2 is made of a magnesium alloy.

The battery pack of Comparative Example 2 has a housing made of polypropylene resin but is similar in shape to that of Example 2. Moreover, Comparative Example 2 has no equivalent to the heat transfer plate. The other configuration (electric circuit, temperature sensor, wire, or the like) thereof is similar to that of Example 2.

The battery packs of Example 2 and Comparative Example 2 were each subjected to tests similar to those conducted on the battery packs of Example 1 and Comparative Example 1. The test results are as follows.

In Example 2, after charging was performed with constant current and constant voltage, the difference between the highest and lowest temperatures of the battery module of the battery pack was measured and found to be about 5° C. Moreover, the difference in battery module temperature between Example 2 and Comparative Example 2 was found to be 20° C.

Charging and discharging were repeatedly performed on these battery packs to evaluate their service life. The battery packs were charged with constant-current and constant-voltage and discharged at a current of 4.2A down to a voltage of 3V.

Figure 9:
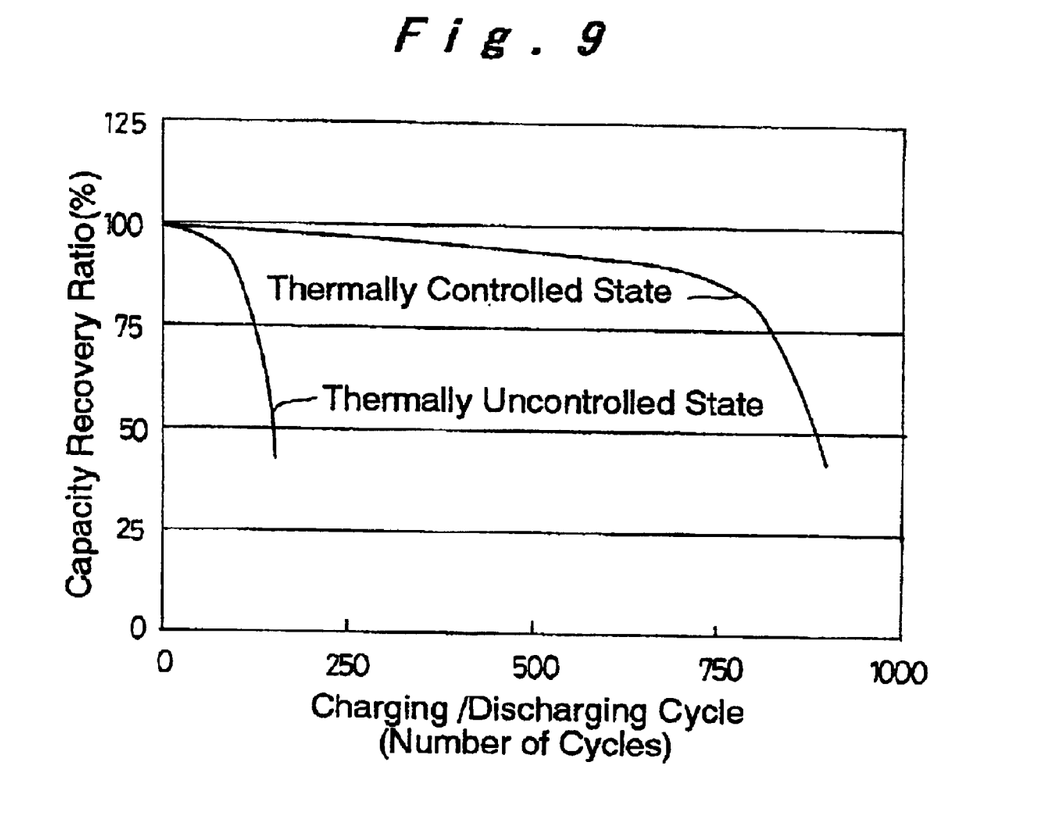
FIG. 9 is a diagram showing the service life characteristics of the battery unit of the battery pack.

FIG. 9 shows the service life of the battery pack of Example 2, as observed when it was in a thermally controlled state and when it was in a thermally uncontrolled state. A lithium-ion secondary battery generates heat during charging and discharging and thus suffers from degradation in the battery life characteristics. Thus, in the battery pack of the present invention, a rise in the battery temperature due to heat generated in the battery is satisfactorily suppressed. Further, by minimizing the difference in temperature between the battery modules, the service life of the battery is significantly prolonged. Note that, from the results of the tests conducted on the battery packs of Examples 1 and 2, it will be understood that the present invention produces satisfactory effects regardless of battery type.

Note that, in Example 1, the battery module consists of 5 batteries and the total number of the batteries included in the battery pack is 50. By contrast, in Example 2, the battery module consists of 3 batteries and the total number of the batteries included in the battery pack is 36. However, the number of batteries is not particularly limited thereto. In practice, it is preferable that the number of batteries constituting a single battery module fall in a range of 1 to 12 and that the total number of the batteries included in the battery pack equal to 360 or less. Moreover, the battery modules are electrically connected in series with one another in Example 1, but are electrically connected with one another by a combination of series connection and parallel connection in Example 2. However, it is needless to say that they may be connected in parallel with one another.

Further, in Examples, the heat transfer plates are made of aluminum, and the housing is made of a magnesium alloy. However, even if aluminum, copper, magnesium, an alloy composed mainly of one of them, or thermally conductive resin is used instead, substantially the same effects are obtained.

INDUSTRIAL APPLICABILITY

As described heretofore, according to the battery pack embodying the present invention, a rise in battery temperature due to heat generation is suppressed, thereby preventing degradation of the charging characteristics and shortening of the service life. Moreover, by performing discharge control, the service life characteristics improve. That is, the present invention is advantageous in improving charging characteristics and service life characteristics of a battery pack.

What is claimed is:

1. A battery pack comprising:
   a battery unit composed of a plurality of batteries arranged flatly, the batteries being electrically connected with one another by either series or parallel connection, or a combination of series connection and parallel connection;
   a pair of heat transfer plates made of a material exhibiting excellent thermal conductivity and arranged in parallel to a surface where the battery unit is arranged, of which one makes surface contact with a top-surface side of each of the batteries constituting the battery unit, and an other makes surface contact with a back-surface side of each of the batteries constituting the battery unit; and
   a housing made of a material exhibiting excellent thermal conductivity, the housing accommodating the battery unit and the pair of heat transfer plates and making surface contact with the pair of heat transfer plates.

2. The battery pack according to claim 1, wherein the housing has projections and depressions formed on its outer surface.

3. The battery pack according to claim 1, wherein the heat transfer plates are made of aluminum, copper, magnesium, an alloy composed mainly of one of them, or a thermally conductive resin which exhibits excellent thermal conductivity.

4. The battery pack according to claim 1, wherein the housing is made of aluminum, copper, magnesium, an alloy composed mainly of one of them, or a thermally conductive resin which exhibits excellent thermal conductivity.

5. The battery pack according to claim 1, wherein N pieces of the batteries are axially connected with one another and N pieces of connected batteries are arranged in M rows in parallel to each other to constitute the battery unit, and
   wherein the battery unit is sandwiched between the pair of heat transfer plates, which have in their inner surfaces a groove whose sectional profile coincides with part of a section of the battery, such that N pieces of connected batteries are each received in the groove while being kept in a surface contact state.

6. The battery pack according to claim 5, wherein the battery is of a cylindrical shape, and the groove of the heat transfer plates has an arc-shaped section.

7. The battery pack according to claim 5, wherein the heat transfer plates are made of a thermally conductive resin exhibiting excellent thermal conductivity and exhibit softness and elasticity.

8. The battery pack according to claim 1, wherein the housing is composed of a housing body and a lid, and one of the heat transfer plates is formed integrally with the housing body and the other heat transfer plate is formed integrally with the lid.

9. The battery pack according to claim 1, further comprising: a circuit board for performing electrical control; and a temperature sensor for measuring battery temperature, of which both are housed in the housing.

10. The battery pack according to claim 9, wherein N pieces of the batteries are axially connected and are also electrically connected in series with one another, and N pieces of connected batteries are arranged in M rows in parallel to each other to constitute the battery unit, and wherein a circuit is provided for measuring temperature and voltage separately for each of N pieces of batteries.

11. The battery pack according to claim 10, wherein the letter N represents numbers ranging from 1 to 12, and the letter M represents numbers ranging from 2 to 30.

12. The battery pack according to any of claims 1 to 11, wherein the battery is an alkaline storage battery or a lithium-ion secondary battery.

* * * * *